United States Patent [19]

Moore

[11] Patent Number: 5,067,126
[45] Date of Patent: Nov. 19, 1991

[54] METHOD AND APPARATUS FOR MAPPING A DIGITAL SIGNAL CARRIER TO ANOTHER

[75] Inventor: Thomas E. Moore, Edmonton, Canada

[73] Assignee: Telecommunications Research Laboratories, Edmonton, Canada

[21] Appl. No.: 389,768

[22] Filed: Aug. 4, 1989

[30] Foreign Application Priority Data

May 30, 1989 [CA] Canada .................................. 601201

[51] Int. Cl.⁵ ............................. H04J 3/04; H04J 3/22
[52] U.S. Cl. ...................................... 370/112; 370/84; 370/102
[58] Field of Search ...................... 370/84, 112, 1, 102, 370/60, 60.1, 94.1, 94.2, 94.3, 58.1, 58.2, 58.3, 100.1; 375/112

[56] References Cited

U.S. PATENT DOCUMENTS

| | | | |
|---|---|---|---|
| 4,791,652 | 12/1988 | McEachern et al. | 370/102 |
| 4,811,340 | 5/1989 | McEachern et al. | 370/102 |
| 4,928,275 | 5/1990 | Moore et al. | 370/102 |
| 4,961,188 | 10/1990 | Lau | 370/100.1 |
| 4,967,405 | 10/1990 | Upp et al. | 370/1 |

OTHER PUBLICATIONS

American National Standard for Telecommunications, "Digital Hierarchy Electrical Interfaces", ANSI Doc. T1.102, Aug. 1987.
American National Standard for Telecommunications, "Digital Hierarchy Optical Interface Rates and Formats Specification", ANSI Doc. T1.105, Sep. 1988.
T. E. Moore, "Effect of Synchronizer Stuff Threshold Crossing Detection Implementation on Waiting Time Jitter", *Conf. Proc. of 14th Biennial Symposium on Communications*, Kingston, Canada, Jun. 1988.
W. D. Grover, T. E. Moore, and J. A. McEachern, "Waiting Time Jitter Reduction by Synchronizer Stuff Threshold Modulation", *Proc. IEEE GLOBECOM '87*, Tokyo, Japan, Nov. 1987.
Bell Communications Research, "Asynchronous Digital Multiplexer Requirements and Objectives", *Technical Reference TR-TSY-000009*, Issue 1, May 1986.
D. L. Duttweiler, "Waiting Time Jitter", *Bell System Technical Journal*, vol. 51, pp. 165-207, 1972.
"Threshold Modulation for Jitter Reduction", J. A. McEachern and T. E. Moore, ECSA Contribution T1X1.4/87-430, Jan. 1987 (D).
T. E. Moore, "Jitter Analysis of Asynchronous Payload Mappings", ESCA Contribution T1X1.4/86-447, Nov. 1986.

*Primary Examiner*—Douglas W. Olms
*Assistant Examiner*—Wellington Chin
*Attorney, Agent, or Firm*—Anthony R. Lambert

[57] ABSTRACT

A DS-3 to 28 VT1.5 SONET Interface Circuit is shown, without using standard intermediate DS-2 and DS-1 Desynchronizer Phase-Lock Loops. The elimination of DS-2 and DS-1 Desynchronizer Phase Lock Loops results in a significant reduction in cost and complexity of SONET interface circuits for the existing asynchronous digital multiplex hierarchy.

4 Claims, 2 Drawing Sheets

FIG. 1: PRIOR ART

METHOD AND APPARATUS FOR MAPPING A DIGITAL SIGNAL CARRIER TO ANOTHER

FIELD OF INVENTION

The present invention relates to a method and apparatus for a DS-3 to 28 VT1.5 SONET (Synchronous Optical Network) Circuit without DS-1 and DS-2 Desynchronizer Phase-Lock Loops.

BACKGROUND OF THE INVENTION

In the telecommunications industry a recent development known as the Synchronous Optical NETwork (SONET) is currently being standardized by the Exchange Carriers Standards Association (ECSA) and the International Telegraph and Telephone Consultative Committee (CCITT). SONET is a new optical interface specification with enough flexibility to transport many different types of payloads (i.e. voice, data, video, and new services). The currently proposed SONET standard contains specific requirements for mapping signals from the existing digital hierarchy to the new SONET standard. The existing digital transmission hierarchy includes the following signals carriers and corresponding data rates: DS-1 at 1.544 Mb/s; DS-2 at 6.312 Mb/s; and DS-3 at 44.736 Mb/s [*American National Standard for Telecommunications*, "Digital hierarchy electrical interfaces", ANSI Doc. T1.102, August 1987]. The DS-1 signal is the basic building block of the telecommunication transmission network. Twenty-four voice channels can be encoded into a each DS-1 signal stream. The bit steams of smaller signal carriers can be fed into larger carriers. For example, four DS-1 signal carriers can be fed into one DS-2 carrier and 7 DS-2 Carriers can be fed into one DS-3 carrier.

DS-1 signals can be mapped into a standard SONET signal known as VT1.5 (1.728 Mb/s) through an established technique known as bit stuffing. Bit stuffing allows the slower rate DS-1 signal to be accurately mapped into the higher rate SONET VT 1.5 signal. Efficient mapping of DS-1 signals into SONET is critical because DS-1 transmission facilities represent a significant portion of the existing telecommunication transmission network. Circuits that provide the interface function between the existing multiplex hierarchy and SONET are currently being developed by telecommunications equipment manufacturers. One of the interfaces that will be introduced in the first generation of SONET based equipment is a DS-3 to 28 VT1.5 SONET circuit. In this circuit, a DS-3 signal is demultiplexed into 28 DS-1 signals in two steps, DS-3 to DS-2 and DS-2 to DS-1, and each DS-1 subsequently mapped into a VT1.5 signal as specified by the SONET standard [American National Standard for Telecommunications, "Digital hierarchy optical interface rates and formats specification", ANSI Doc. T1.105, Sept. 1988]. The DS-3 to 28 VT1.5 SONET circuit would be needed in all SONET-compatible multiplex and digital cross-connect systems equipment requiring VT 1.5 (i.e.DS-1) visability.

At each demultiplexing step, prior art systems have required Desynchronizer Phase-Lock Loops (PLLs) to reduce jitter, and thus control signal degradation. These PLLs increase the complexity of the DS-3 to 28 VT1.5 SONET interface circuit and thus increase the expense of manufacturing the circuit. The conventional understanding in the art has been that removal of the Desynchronizer PLLs increases the jitter resulting from the demultiplexing beyond the network jitter requirements.

The invention provides a method of demultiplexing and an apparatus for demultiplexing the digital signal carriers without desynchronizer phase-lock loops while meeting jitter standards, and in one aspect comprises a process for the mapping of a first digital signal carrier carrying a first digital signal to a second digital signal carrier comprising; demultiplexing the first digital signal to produce a second digital signal; deriving a gapped clock from the first digital signal carrier; and writing the second digital signal to an elastic store using the gapped clock.

Further summary of the invention is found in the claims.

A DESCRIPTION OF THE FIGURES

There will now be described a preferred embodiment of the invention with reference to the figures by way of illustration, in which, FIG. 1 is a functional block diagram of a conventional DS-3 to SONET VT1.5 interface circuit; and FIG. 2 is a functional block diagram of a DS-3 to VT1.5 SONET interface circuit according to the invention.

DESCRIPTION OF THE PREFERRED EMBODIMENTS

Conventional Method for DS-3 to 28 VT1.5 SONET Mapping

The conventional design of a DS-3 to DS-1 demultiplexer includes phase-lock loops (PLL) to desynchronize the DS-2 and DS-1 signals. Desynchronizer PLLs control a timing noise phenomenon known as jitter. [D. L. Duttweiler, "Waiting time jitter", *Bell System Technical Journal*, vol. 51, pp. 165-207, 1972.] (A) [The references marked in this disclosure by the letters (A), (B), (C), (D) and (E) are each incorporated in this specification by reference in their entirety.] If jitter is not controlled severe signal degradation can result.

Figure 1:
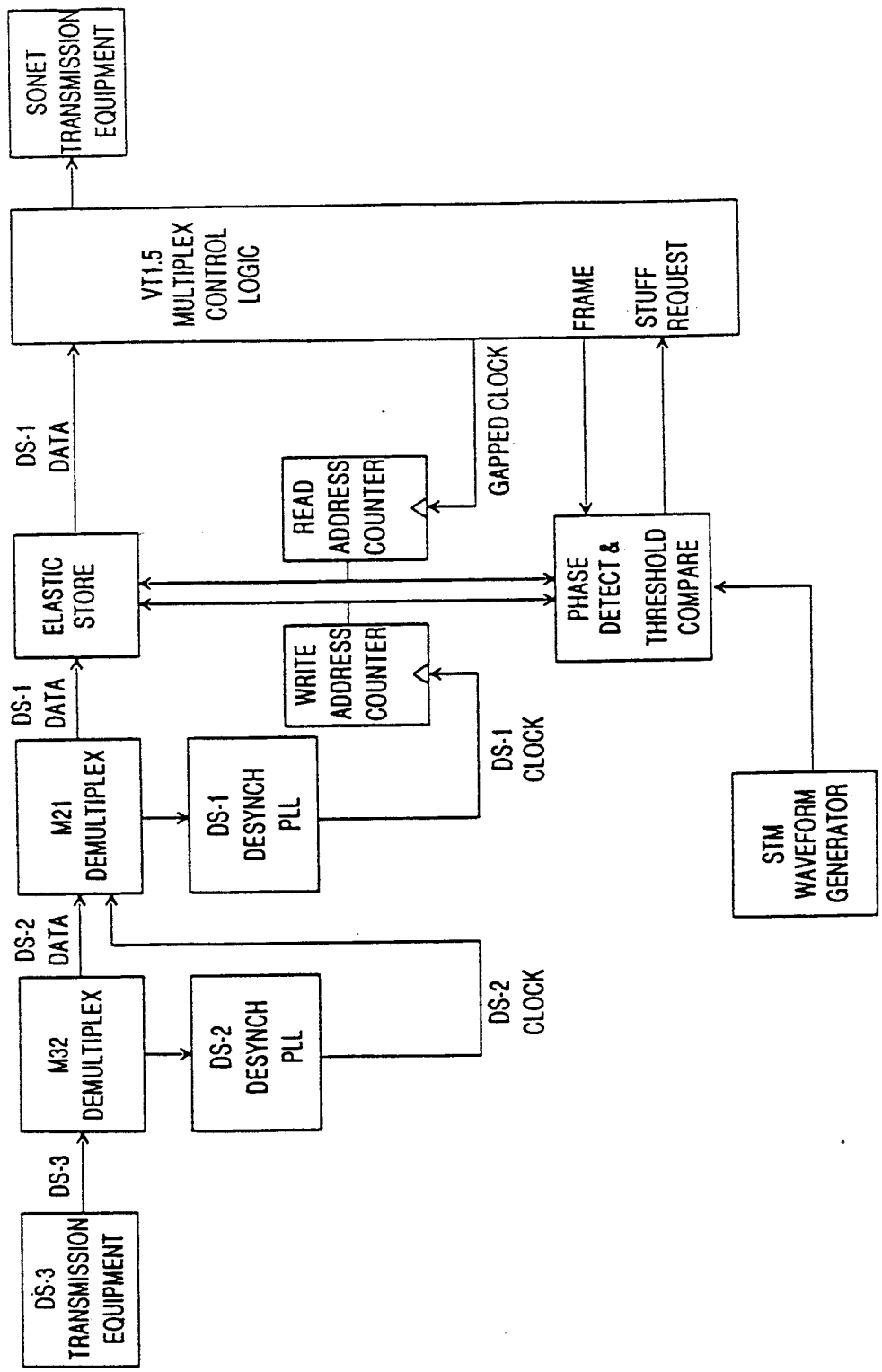

A partial block diagram of the DS-3 to 28 VT1.5 SONET interface circuit using DS-1 and DS-2 Desynchronizer PLLs is given in FIG. 1. The DS-3 signal is first demultiplexed to DS-2 by the M32 Demultiplex block and then to DS-1 by the M21 Demultiplex block. M32 demultiplexers divide DS-3s into groups of 7 DS-2s; M21 demultiplexers divide DS-2s into groups of 4 DS-1s. Desynchronizer PLLs are employed at both the M32 and M21 stages to recover the timing of the DS-2 and DS-1 clocks respectively. The DS-1 clock is fed into the Write Address Counter block which clocks the DS-1 data into the elastic store block. The corresponding read address counter is timed by the VT1.5 multiplex control logic as specified by the DS-1 to VT1.5 mapping format in the SONET draft standard [American National Standard for Telecommunications, "Digital hierarchy optical interface rates and formats specification", ANSI Doc. T1.105, Sept. 1988]. The Phase Detect & Threshold Compare circuit block in FIG. 1 is used to realize frame-synchronous stuff threshold crossing detections [T. E. Moore, "Effect of synchronizer stuff threshold crossing detection implementation on waiting time jitter", Conf. Proc. of 14th Biennial Symposium on Communications, Kingston, Canada, June 1988] (B). Read and write addresses of the Elastic Store block are compared in the Phase Detect & Threshold Compare block to the current value of the stuff request threshold. A stuff request signal is generated when the threshold is exceeded. The threshold value is varied systematically by the Stuff Threshold Modulation (STM) Waveform Generator block [W. D. Grover, T. E. Moore, and J. A. McEachern, "Waiting time jitter reduction by synchronizer stuff threshold modulation", *Proc. IEEE GLOBECOM '87*, Tokyo, Japan, November 1987] (C). The STM Waveform Generator block is required in all DS-1 to VT1.5 synchronizer circuits in order to meet network DS-1 jitter generation requirements [Bell Communications Research, "Asynchronous digital multiplexer requirements and objectives", *Technical Reference* TR-TSY-000009, Issue 1, May 1986]. Implementation details are provided in "Threshold modulation for jitter reduction", J. A. McEachern and T. E. Moore, ECSA Contribution T1X1.4/87-430, January 1987 (D).

The last block in the diagram, VT1.5 Multiplex Control Logic, controls the timing and insertion of DS-1 data and SONET overhead bits to form a VT 1.5 signal. Once within SONET signals are switched and/or routed through various facilities.

The inventor has provided a method in which a DS-3 to 28 VT1.5 SONET interface circuit can be designed without employing intermediate DS-2 and DS-1 desynchronizer phase-lock loops (PLLs). Elimination of DS-2 and DS-1 desynchronizer PLLs results in a significant reduction in the cost and compexity of SONET interface circuits for the existing asynchronous digital multiplex hierarchy. For an all-digital interface design, a conservative estimate of 400 gates for each DS-1 or DS-2 desynchronizer PLL implies an overall circuit reduction of 14,000 gates in an all digital CMOS implementation. A higher speed technology, for example, emittor coupled logic, would be required for DS-2 digital phase-lock loops implementation.

The viability of a DS-3 to SONET interface circuit with and without DS-1 and DS-2 desynchronizer phase lock loops was demonstrated in software simulation models running on a Cyber 205 supercomputer. Two software models of back-to-back M13 multiplexing followed by back-to-back DS-1 to VT1.5 mapping were designed. The first model included intermediate DS-2 and DS-1 desynchronizer PLLs while the second model did not. Results of the analysis show the maximum absolute jitter remained below the DS-1 jitter generation requirements for both models, demonstrating that the removal of intermediate DS-2 and DS-1 desynchronizer PLLs is feasible. The modelling technique described above has been endorsed by the ECSA as a method for analyzing jitter performance of new payload mapping proposals for SONET. [T. E. Moore, "Jitter analysis of asynchronous payload mappings", ECSA Contribution T1X1.4/86-447, November 1986] (E).

FIG. 2

Figure 2:
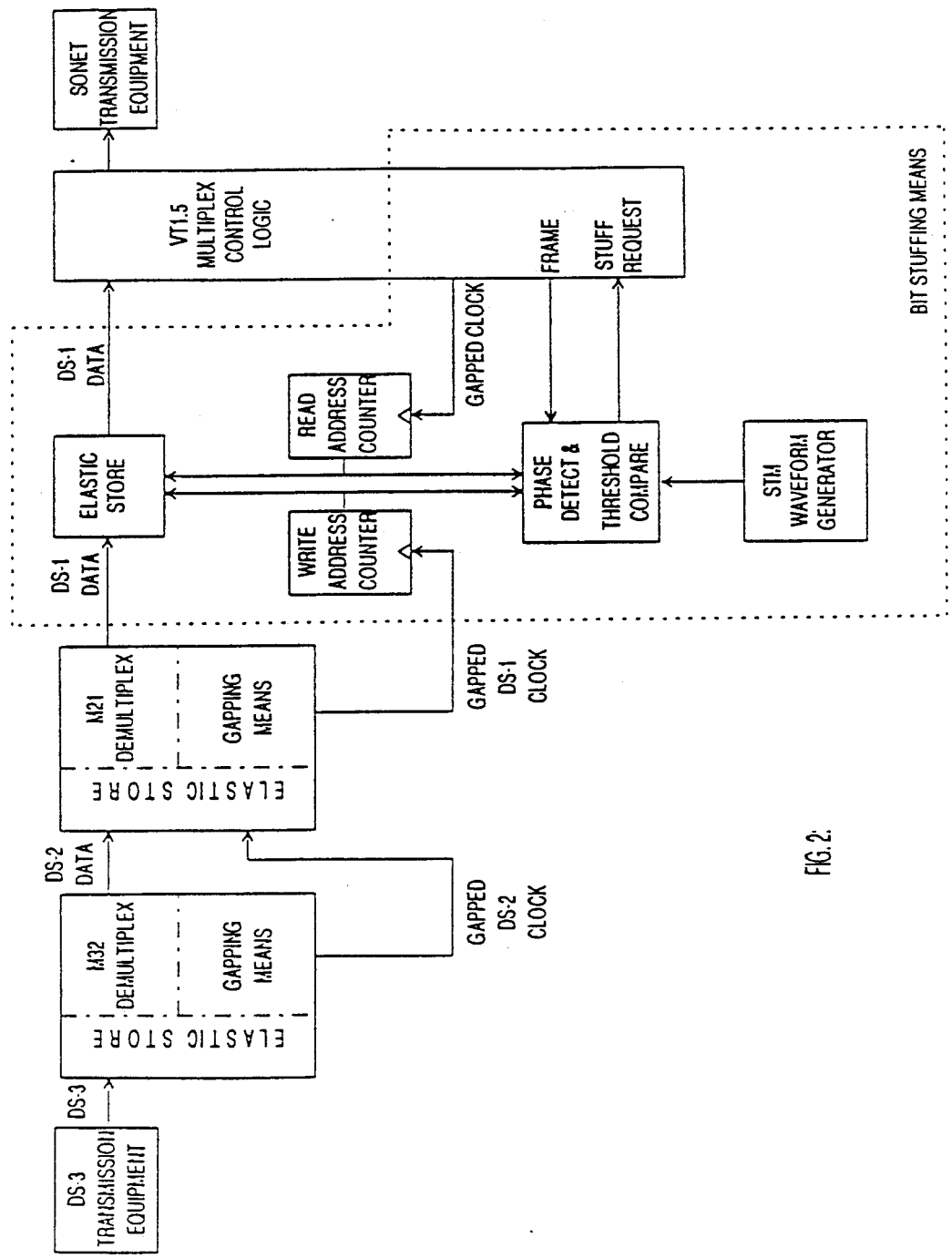

FIG. 2 is a partial block diagram of a multiplex model for DS-3 to VT 1.5 mapping without desynchronizing phase-locked loops (PLLs). System parameters are similar to FIG. 1 with the exception that all DS-2 and DS-1 phase locked loops are removed and that gapped clocks are used to write DS-2 and DS-1 data to the M21 Demultiplexer block and the Elastic Store block respectively. The gapping function is carried out in the demultiplexers M32 and M21 as is well known in the art.

Description of a Gapped DS-2 Clock

In a gapped DS-2 clock, the rising edge of each DS-2 clock pulse is timed by the rising edge of every 7th DS-3 clock pulse, after the DS-3 clock pulses corresponding to the DS-3 overhead bit positions are removed. Every 12th DS-2 clock edge is therefore delayed (gapped) by one DS-3 time-slot. In addition, a DS-2 clock pulse corresponding to a stuff bit (from M23 multiplexing) is removed from the gapped DS-2 clock resulting in a gap of seven DS-3 time-slots between two adjacent DS-2 clock edges in this case. The gapped DS-2 clock is used to write the DS-2 bits directly into the M21 Demultiplex block as indicated in FIG. 2.

Description of a Gapped DS-1 Clock

The DS-1 data are clocked using a gapped clock, derived from the gapped DS-2 clock, in a manner similar to that described in the previous paragraph. A gapped DS-1 clock is timed by the rising edge of every 4th rising edge of the gapped DS-2 clock, after the DS-2 overhead clock pulses have been removed. Every 12th DS-1 clock pulse is therefore delayed (gapped) by one DS-2 time-slot. A gapped DS-1 clock pulse corresponding to a M12 stuff bit is removed completely leaving a gap of four DS-2 time-slots for this case. This DS-1 gapped clock will contain additional small gaps because the DS-2 clock used to derive gapped DS-1 clocks consisted of gaps corresponding to the DS-3 overhead and M23 stuff bits. The gapped DS-1 clock is used to write the DS-1 bits directly into the Elastic Store block as indicated in FIG. 2.

It will be understood that a preferred embodiment of the invention has been described here, and that immaterial modifications could be made to the invention, without departing from the spirit of the invention, and these are intended to be covered by the scope of the claims which follow.

I claim:

1. A process for the mapping of a first digital signal carrier carrying a first multiplexed digital signal to a second digital signal carrier comprising:
   demultiplexing the first digital signal to produce a second digital signal and to derive a gapped clock;
   writing the second digital signal to an elastic store using the gapped clock; and
   reading the second digital signal from the elastic store.

2. The process of claim 1 in which the second digital signal is a SONET signal.

3. Apparatus for the mapping of a first digital signal carrier carrying a first digital signal to a second digital signal carrier comprising:
   a demultiplexer for demultiplexing the first digital signal to produce a second digital signal;
   gapping means for gapping the first digital signal carrier to derive a gapped clock;
   writing means for writing the second digital signal to an elastic store using the gapped clock; and
   reading means for reading the second digital signal from the elastic store.

4. Apparatus for mapping a DS-3 digital signal to a SONET signal, the apparatus comprising:
   a first demultiplexer for demultiplexing the DS-3 signal to generate a DS-2 signal and to generate a gapped DS-2 clock;
   a second demultiplexer to demultiplex the DS-2 signal to generate a DS-1 signal and to generate a gapped DS-1 clock; and
   bit stuffing means for bit stuffing the DS-1 signal to create a SONET signal.

* * * * *